3,064,610
TORPEDO CONTROL CIRCUIT
Harold C. Montgomery, Chatham, N.J., assignor to Bell
Telephone Laboratories, Incorporated, New York,
N.Y., a corporation of New York
Filed Feb. 21, 1947, Ser. No. 730,175
5 Claims. (Cl. 114—23)

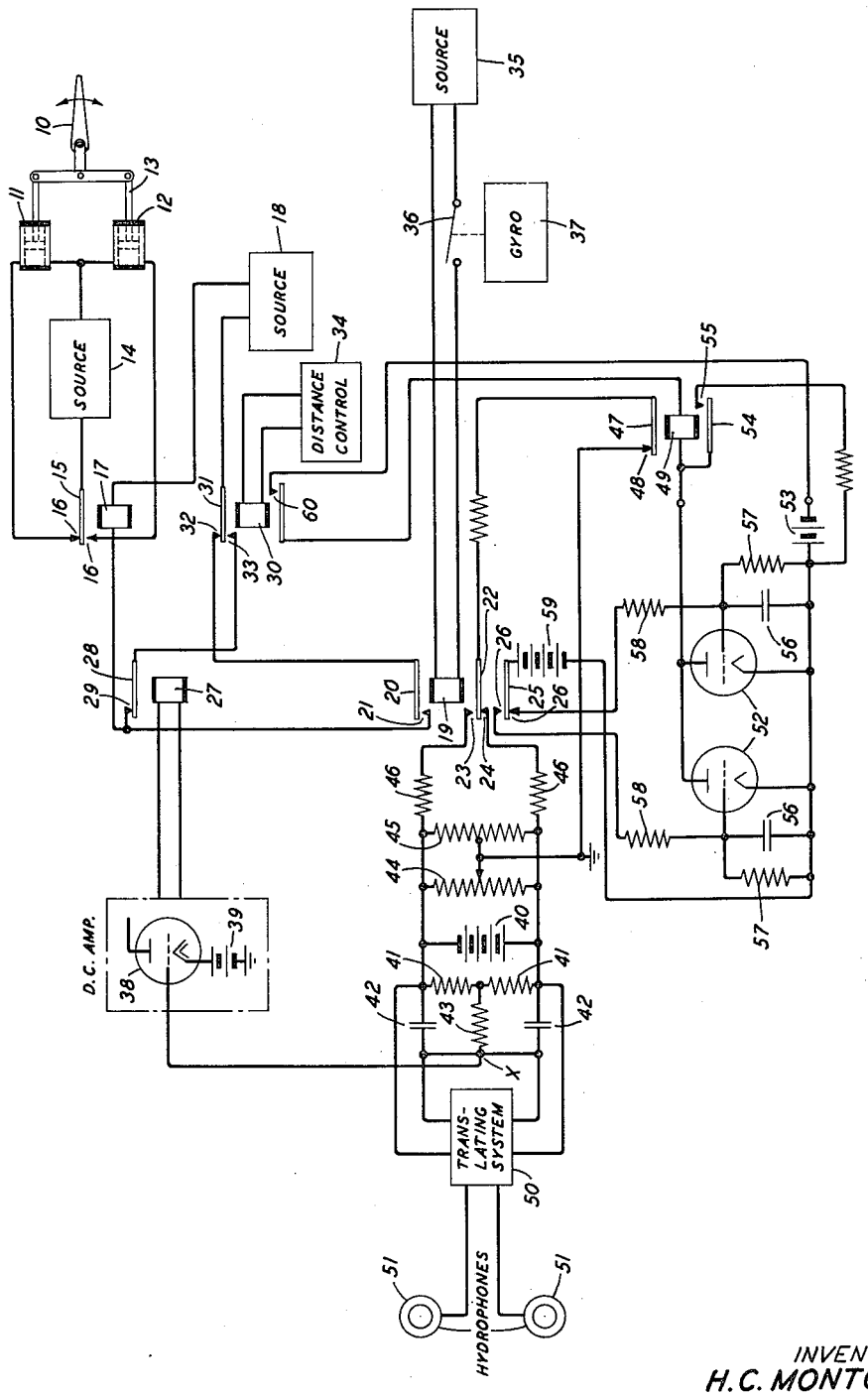

This invention relates to control circuits and more particularly to torpedo steering systems of the type disclosed in the application Serial No. 600,906, filed June 22, 1945 of John C. Steinberg.

In steering systems of the type disclosed in the application above identified, the rudder is subject to control to be deflected in one or the opposite direction in accordance with the polarity of the potential applied to a control element, for example an amplifier. This potential is derived from a network capable of resolving two signal components into a resultant signal, one of the components being of fixed, preassigned amplitude and of polarity determined by the direction of departure of the torpedo from a preset gyroscope controlled course and the other component being of polarity determined by an amplitude proportional to the bearing of the target relative to the torpedo. The latter component is obtained from a signal translating system responsive to underwater signals such as ship and propeller noise emanating from a target vessel. The former component may be obtained from a source and resistors coupled to the network over circuits including transfer contacts of a relay controlled by the gyroscope.

As disclosed in the application above identified, these circuits including the transfer contacts may be opened, thereby to dissociate the gyroscope control from the resolving network and place the rudder under control in accordance with underwater signals alone, by the operation of a gate relay. The gate relay control circuit involves a condenser and charging and discharging circuits therefor arranged so that while either of the contacts of the gyroscope controlled relay is closed the condenser charges at a prescribed rate and when contact is broken the condenser discharges quickly. When the torpedo is at a position relative to the target such that the signal component due to underwater signals is sufficient to override that due to the gyroscope control, one or the other of the relay transfer contacts remains closed for a period of duration adequate to allow the condenser to charge to a value sufficient to effect operation of the gate relay and thereby disable the gyroscope control.

In some cases, in such a system, because of chatter of the gyroscope controlled relay and the quick discharge rate of the condenser aforenoted, operation of the gate relay may not result even though the torpedo is within such position relative to the target that the rudder should be committed to control in accordance with underwater target signals alone.

One object of this invention is to prevent delay of operation of the gate relay in a system of the type above described due to chatter of the gyroscope relay, whereby the commission of the rudder to control in accordance with target signals alone is assured at a long target to torpedo range.

In accordance with one feature of this invention, in a system of the type above described, the gate relay control circuit includes a pair of condensers, respective resistors associated with the condensers and constituting permanently closed discharge paths therefor, and individual charging circuits for the condensers controlled by the gyroscope controlled relay so that one or the other charging circuit is closed in accordance with the condition of the relay. When, due to overriding of the gyroscope signal component by the target signal component, the relay remains in one condition, i.e. operated or released, for a preassigned time one of the condensers discharges to a value such that operation of the gate relay results.

The invention and the above-noted and other features thereof will be understood more clearly and fully from the following detailed description with reference to the accompanying drawing in which the single FIGURE is a circuit diagram, partly in block form, of a torpedo steering system illustrative of one embodiment of this invention.

Referring now to the drawing, the steering system therein illustrated comprises a rudder 10 which is deflected in one or the opposite direction by solenoids 11 and 12 having cores coupled to the rudder by a suitable linkage 13, the direction of rudder deflection being determined by which of the solenoids is energized. The solenoids are arranged to be energized individually from a source 14, the circuit for each solenoid including the armature 15 and respective contact 16 of a relay 17.

The energizing circuit for the relay 17 includes a source 18 and is controllable by either a gyroscope relay 19 having an armature 20 and associated contact 21, a second armature 22 and associated transfer contacts 23 and 24 and a third armature 25 and associated transfer contacts 26, or a signal control relay 27 having an armature 28 and associated contact 29. This circuit includes also an auxiliary relay 30 having an armature 31 and transfer contacts 32 and 33 and operable by a distance control 34.

The relay 19 is energizable from a source 35 over a switch 36 which is actuated by a gyroscope 37 to open or close in accordance with the direction of departure, i.e. to port or starboard, of the torpedo from a preset gyroscope course.

The relay 27 is controlled by a direct current amplifier the first stage 38 of which normally is biased at cut-off, as by a battery 39, so that normally the relay 27 is deenergized and its armature 28 is in engagement with the contact 29. The input circuit for the direct current amplifier includes a differential or resolving network which functions to resolve several control signals into a resultant potential at point $x$ thereof applied to the control grid of the first stage 38 of the amplifier. This network comprises a source 40, such as a battery as shown, connected across a pair of equal resistors 41 which are bridged by equal condensers 42 through a common resistor 43. The source 40 is bridged also by a balancing potentiometer resistance 44 and a resistor 45 opposite ends of which are connected to the contacts 23 and 24 through equal resistors 46. The contact arm of the potentiometer resistance 44 and midpoint of the resistor 45 are connected to ground, as shown, and to the armature 22 of the relay 19 over the armature 47 and contact 48 of a gate relay 49 which normally is deenergized.

As is apparent, while the relay 49 is deenergized a protential component of one or the opposite polarity, determined by the condition of the relay 19 and, hence, by the position of the torpedo relative to the gyroscope course, will be established at the point $x$ of the resolving network.

A second potential component is established at the point $x$ by a translating system 50 associated with a pair of hydrophones 51 mounted on opposite sides, port and starboard, of the longitudinal axis of the torpedo so that the relative response thereof to underwater signals, such as ship and propeller noises emanating from a target vessel, is a function of the bearing, relative to the torpedo, of the source from which the underwater signals emanate. The translating system, which may be of the construction disclosed in the application Serial No. 491,795, filed June 22, 1943 of Donald D. Robertson, converts the hydrophone outputs into a signal at the point $x$ of polarity determined by an amplitude proportional to the relative outputs of the hydrophones so that this signal is a measure of the bearing relative to the torpedo of the source, e.g. target vessel, of the underwater signals received by the hydrophones.

The operation of the system as thus far described is as follows: When the torpedo is launched, the relays 17, 19, 27, 30 and 49 are in the condition shown on the drawing. Hence, as will be apparent, inasmuch as the relay 30 is deenergized and its contact 33 is open, the relay 27 cannot exert any control over the steering relay 17. The latter is under control of the gyroscope relay 19, the circuit being traced from the source 18, through relay 17 over contact 21 and armature 20 of relay 19 and contact 32 and armature 31 of relay 30 and thence back to the source. Thus, the torpedo proceeds on the gyroscope course. When the torpedo has proceeded from the launching vessel a distance sufficient to place it beyond the effective underwater signal field of this vessel so that the steering system will not be subject to control in accordance with signals emanating from this vessel, the distance control 34 causes operation of the relay 30. Consequently, the circuit previously traced is broken at the contact 32 and the steering relay 17 is placed under control of the relay 27 over the circuit traced from the source 18 to the relay 17, over contact 29 and armature 28 of relay 27 and contact 33 and armature 31 of relay 30 and thence back to the source 18.

At this time, the position of the torpedo relative to the target may be such that the target signal level at the hydrophone either is or is not sufficiently high to result in a signal of amplitude capable of effecting steering, at the point $x$ in the resolving network. If the target signal level is not sufficiently high, the torpedo proceeds under gyroscope control inasmuch as the potential at point $x$, and hence the condition of the direct current amplifier and the relay 27 is determined by which of the contacts 23 or 24 of the gyroscope relay 19 is engaged by the armature 22.

When the target signal level is or reaches the prescribed amplitude, the potential at the point $x$ is the resultant of that due to the target signals received at the hydrophones 51 and that due to operation of the relay 19 by the gyroscope. Thus, the torpedo proceeds under combined target signal and gyroscope control.

It is advantageous from the standpoint of accuracy of attack of the target and effective range that the torpedo be placed under steering control in accordance with target signals alone at a maximum target to torpedo range. Such commission of the torpedo to target signal control may be effected with protection against false steering on underwater signals due to torpedo self-noise as disclosed in the application of John C. Steinberg heretofore identified, by disabling the gyroscope control when the component of potential at the point $x$ due to underwater signals received by the hydrophones reaches a value just above that due to underwater signals resulting from torpedo self-noise. Specifically, the gyro control may be disabled by operation of the relay 49 whereby, as will be apparent, the resistors 45 and 46 are effectively disconnected from the input circuit of the direct current amplifier and the relay 19 cannot affect the voltage at point $x$.

The relay 49 is connected in the common anode circuit of a pair of substantially identical electron discharge devices 52 over the normally open contact 60 of the relay 30, the circuit including also a source 53 and the relay having a lock-up armature 54 and associated contact 55 connected as shown. The input circuits for the two devices include identical condensers 56 and resistors 57, each condenser and associated resistor having one common end connected to a respective contact 26 of the relay 19 through equal resistors 58, which are of the same order of magnitude as the resistors 57. A source 59 is connected between the armature 25 and the other end of the two condenser-resistor combinations 56, 57.

When the torpedo is proceeding under gyroscope control by operation of the relay 19, it hunts about the gyroscope course so that the armature 25 engages its two transfer contacts 26 alternately for substantially equal periods, and the two condensers 56 are charged alternately. Each condenser discharges continuously through the resistor 57 associated therewith. The circuit parameters are correlated so that when the torpedo thus travels under gyroscope control, the two devices 52 are biased beyond cut off, whereby the relay 49 remains released.

When the torpedo reaches such position relative to the target that the voltage component at point $x$ due to the translating system 50 is sufficient to overcome the component at this point due to the gyroscope control, the armature 25 remains in engagement with one of its contacts 26 longer than with the other. Consequently, the condenser 56 connected to the other contact discharges through its associated resistor 57 and the bias upon the corresponding device 52 falls below the cut-off value. Therefore, this device becomes conducting so that the relay 49 operates, locks up and effectively disables the gyro control by disengaging the armature 47 from its contact 48. Hence, the torpedo thereafter proceeds with the rudder controlled in accordance with target signals alone.

It will be noted that the circuit for relay 49 is open at contact 60 until the relay 30 operates, so that false operation of the relay 49 is prevented.

Certain factors are to be borne in mind in correlating the parameters of the circuit for effecting operation of the gate relay 49. The period of dwell of the armature 25 with one of the contacts 26 to allow discharge of one of the condensers 56 so that the device associated with this condenser will be rendered conductive should be somewhat longer than the hunting period of the torpedo under gyroscope control alone. For example, in typical cases where the gyroscope period is of the order of 1.5 to 3 seconds, the parameters of the circuit in question may be such that operation of the relay 49 occurs within 3 to 6 seconds of the time when, because of the effect of the target signals, the armature 25 remains in engagement with one of the contacts 26. In a specific circuit, condensers 56 of 4 microfarads capacity, a source 59 of 45 volts and resistors 57 and 58 each of 1 megohm have been found satisfactory.

The dwell of the armature 25 upon the two contacts 26 while the torpedo is under gyroscope control may not be equal so that some variation in the mean voltages on the two condensers occurs. However, such variation is within acceptable limits because of the exponential character of the condenser charge and discharge curves. Considering one condenser circuit, for example, if the dwell is longer on the charging portion of the cycle, the charging rate decreases and the discharge rate increases. Thus, the circuit in itself opposes variations in the mean voltages noted.

It will be noted that operation of the relay 49 is dependent upon the discharge of one or the other of the condensers 56. As has been pointed out heretofore, each condenser is arranged to discharge continuously through its associated resistor 57. Consequently, control of the gate relay 49 is substantially unaffected by chatter at the relay contacts 26 inasmuch as the discharge time requisite to effect operation of the relay 49 is sufficiently long to avoid disruption by momentary chatter at the contacts 26. Thus, failure of the circuit for disabling the gyroscope control when the target signals reach the preassigned level is prevented and the torpedo is committed to steering in accordance with target signals alone at the maximum permissible target to torpedo range.

Although a specific embodiment of the invention has been shown and described, it will be understood that it is but illustrative and that various modifications may be made therein without departing from the scope and spirit of this invention as defined in the appended claims.

What is claimed is:

1. A steering system for a moving body, comprising a steering member, means including a control circuit for effecting deflection of said steering member in one or the opposite direction in accordance with the polarity of the potential at a point in said circuit, a first control means responsive to signals for producing at said point a first potential component of polarity and amplitude determined by the bearing, relative to the body, of the source of signals received by said first control means, a second control means for producing at said point a second potential component of preassigned amplitude and of polarity determined by the direction of departure of the body from a preset course, and gate means for effectively disabling said second control means when said first component exceeds said second component for a prescribed period, said gate means comprising a pair of condensers, a charging circuit and a permanently closed discharging circuit for each of said condensers, means for closing one or the other of the charging circuits in accordance with the direction of departure of the body from said preset course and means controlled by said condensers for dissociating said second control means from said circuit when the potential across either condenser falls below a preassigned value.

2. A steering system in accordance with claim 1 wherein said condenser controlled means comprises a relay effective when operated to dissociate said second control means from said circuit and a pair of electron discharge devices having a common anode circuit in which said relay is included, each of said condensers being included in the input circuit of a respective discharge device to control the input voltage thereto.

3. A steering system for a torpedo, comprising a rudder, means including a control circuit for effecting deflection of said rudder in one or the opposite direction in accordance with the polarity of the potential at a point in said circuit, a first control means on the torpedo and responsive to underwater signals for producing at said point a first component of potential of polarity determined by an amplitude proportional to the bearing, relative to the torpedo, of underwater signals received by said first control means, gyroscope controlled means for producing at said point a second component of potential of preassigned amplitude and of polarity determined by the direction of departure of the torpedo from a preset course, and means for effectively disabling said gyroscope controlled means when said first component exceeds said second component for a prescribed period, said disabling means comprising a gate effective when operated to dissociate said gyroscope controlled means from said circuit, a pair of condensers, a permanently closed discharge circuit for each of said condensers, individual charging circuits for said condensers, means controlled by said gyroscope controlled means for closing one or the other of the charging circuits in accordance with the direction of departure of the torpedo from said preset course and means for operating said gate when the potential across either condenser falls below a preassigned value.

4. A steering system in accordance with claim 3 wherein said gate is a relay and wherein said gate operating means includes a pair of electron discharge devices having a common output circuit in which said relay is included, each of said condensers being connected in the input circuit of a respective discharge device and effective to render the respective device conductive when the potential across the condenser falls below said preassigned value.

5. A steering system for a moving body, comprising a steering member, a direct current amplifier, means controlled by said amplifier for effecting deflection of said steering member in one or the opposite direction in accordance with the polarity of the potential applied to the input circuit of the amplifier, a first control means on the body responsive to signals for impressing upon said circuit a first component of potential of polarity determined by an amplitude proportional to the bearing relative to the body of signals received by said first control means, a second control means for impressing upon said circuit a second component of potential of preassigned amplitude and of polarity determined by the direction of departure of the body from a preset course, and gate means for dissociating said second control means from said circuit, said gate means comprising relay means effective when energized to dissociate said second control means from said circuit, a pair of electron discharge devices having a common output circuit in which said relay means is included, a pair of condensers each included in the input circuit of a respective discharge device to control the input voltage thereto, a pair of discharge resistors each connected across a respective condenser, and individual charging circuits for said condenser each controlled by said second control means so that each charging circuit is closed when the body departs in a respective direction from said preset course, each condenser being effective to render the discharge device with which it is associated conducting only when the condenser voltage falls below a preassigned value.

No references cited.